United States Patent [19]

Opprecht

[11] Patent Number: 4,677,271
[45] Date of Patent: Jun. 30, 1987

[54] METHOD FOR ELECTRICAL RESISTANCE-WELDING AND INSTALLATION FOR CARRYING OUT SAID METHOD AND USE OF SAID METHOD IN DRUM MANUFACTURE

[76] Inventor: Paul Opprecht, Herrenbergstrasse 10, CH-8962 Bergdietikon, Switzerland

[21] Appl. No.: 569,735

[22] Filed: Jan. 10, 1984

[30] Foreign Application Priority Data

Jan. 17, 1983 [CH] Switzerland .................... 241/83

[51] Int. Cl.$^4$ ............................................. B23K 11/00
[52] U.S. Cl. .................................... 219/93; 219/91.23
[58] Field of Search ............... 219/91.23, 93, 78.01, 219/86.1, 91.2, 117.1

[56] References Cited

U.S. PATENT DOCUMENTS

| | | |
|---|---|---|
| 2,277,871 | 3/1942 | Mitchell et al. ............ 219/93 |
| 4,427,869 | 1/1984 | Kimura et al. ............. 219/93 |

*Primary Examiner*—Clarence L. Albritton
*Assistant Examiner*—C. M. Sigda
*Attorney, Agent, or Firm*—William J. Daniel

[57] ABSTRACT

The leak-tight welding of elongated joints, particularly of circular, interlocked joints, such as, for example, the fluid-tight welding of plugs on drums is achieved by folding over the edge (11), or the circular margins around a circular opening, of the sheet (1) onto which, e.g., a plug (27) or other workpiece is to be welded liquid-tightly, laying the workpiece against the folded-over edge (11), and then applying electrodes (28, 30) on opposite sides of the workpiece and sheet, with sufficient pressure that the folded-over sheet margin (11) is further deformed. In this way, the surface-parts not lying flat against each other at the contact-surface (35/32) of the workpiece and sheet margins are forced into accommodation and an even distribution of pressure along the contact-surface results. When the welding-current is switched on, the current density is essentially uniform throughout the contact-surface and hence a simultaneous welding along the entire contact-surface occurs, producing a a leak-tight joint.

16 Claims, 5 Drawing Figures

METHOD FOR ELECTRICAL RESISTANCE-WELDING AND INSTALLATION FOR CARRYING OUT SAID METHOD AND USE OF SAID METHOD IN DRUM MANUFACTURE

The invention concerns a method of forming along an elongated locus, particularly an interlocked circular joint a liquid-tight joint, between two workpieces by electrical resistance welding, at least one of the workpieces being a sheet having an edge extending adjacent the locus of the joint connecting-place and consisting of a bendable material which can be deformed, under load, beyond its elastic limit, an apparatus for carrying out this method, and the use thereof specifically for attaching plugs to sheet-metal drums.

Methods of this kind are known particularly in the form of roller seam welding methods, for example from the brochure "Mantel-Boden-Deckel-Schweissanlage für Fässer", MBS 1001 D, by the Soudronic AG company, Berdietikon, Switzerland, of September 1977, which relates to the leak-tight welding of sheet-metal drums, and particularly also the liquid-tight welding of drum bottoms and lids with the drum wall along welding-folds provided on the borders of the bottom, lid and wall by means of roller seam welding. Furthermore, it has, of course, also long been known, from can-manufacturing, that roller seam welding can be used to leak-tightly weld elongated joints between the longitudinal borders of a can body. However, roller seam welding is in principle only a continuous sequence of individual, overlapping spot-welds with the workpieces to be welded together being moved each time by the distance between two successive points for spot-welds. In such successive spot-welding operations the achievement of a leak-tight welded seam is relatively simple because the welding-current is necessarily concentrated on each separate spot to be welded and, since the setting of the welding-machine or welding-current and electrode force remain constant, essentially the same conditions prevail during a roller seam welding operation for each one of the successive spot-welds. Thus, with the welding-machine suitably set, the effect can be obtained, along the welding locus of a continuous sequence of approximately like-sized, interlocking or overlapping spot-welds, not extending to the surface of the workpieces, which together form a weld hwich is elongated and, because of its overlapping nature, leak-tight.

However, roller seam welding is not applicable in every case in which two workpieces have to be joined leak-tightly directly to each other along an elongated locus but is essentially limited to the welding of sheets, and even here the welding of sheets of different sheet-thicknesses and/or of different materials generally encounters considerable difficulties. Roller seam welding is particularly unsuitable for producing a leak-tight joint between a sheet and a rigid body of much greater thickness than the sheet thickness, as, for example, the leak-tight welding of a pipe flange onto a sheet, because, in view of the high current density required for welding the rigid body, it can practically hardly be avoided that the sheet will heat up during welding and no longer be able to withstand the electrode-pressure. Though this problem could, in certain circumstances, be reduced by welding each individual spot in the roller seam weld with a series of separate current pulses, thereby applying the requisite heat in steps, so to speak, and allowing the sheet to cool in the intervals between pulses, in practice, however, this mode of roller seam welding cannot, for one thing, be given serious consideration, because roller seam spot-welding in itself already takes up an amount of time corresponding to the number of spots to be welded one after another along the weld seam, and for economic reasons alone this time cannot be increased by applying the power in a chain of pulses for each individual spot to be welded.

Apart from roller seam welding, which, as already stated, is in principle only a sequence of successive individual, overlapping spot-welds, and despite many unsuccessful experiments and efforts on the part of specialists active in welding techniques and technology, a practical electrical resistance-welding method capable of welding together two workpieces along an elongated liquid-tight and/or gas tight joint has not been found. In particular, it has so far not been possible to weld two workpieces leak-tightly together along an elongated locus, simultaneously along the entire locus, in a unified welding process, by means of resistance-welding. This is mainly because it has not been possible to obtain an at least essentially even distribution of the current density along the entire locus, which becomes understandable if one imagines the entire, elongated locus as being formed of a number of individual, like-sized, short sections bordering on one another. When so visualized, during simultaneous welding along the entire elongated connecting-place, all of these sections are electrically connected in parallel, and hence the same current flows in each of them. At the start of welding, the resistance present is represented first and foremost by the contact of the two workpieces, being ideally equally great in each of the sections. Now, the contact resistance in one such section is, however, in practice determined to an essential extent by the pressure with which the two workpieces are pressed onto each other at that section, and this means that, in order to obtain the same current density along the entire elongated locus, the pressure urging the two workpieces together must also be of equal magnitude along said entire locus. In practice, however, such uniform pressure is hardly feasible, because even irregularities in the order of a few microns in the contacting surfaces of the workpieces can lead to a relatively high pressure prevailing in the raised surface-regions and no pressure at all prevailing in those surface-regions lying only a few microns lower. Hence, it would be necessary to carry out an extremely precise processing of the workpiece surfaces over the entire length of the locus prior to welding in order to be able to achieve, to even only a certain extent, the condition of equal pressure between the two workpieces along the entire elongated locus. This extremely precise processing naturally cannot, for economic reasons alone, be practical in mass-production. The reason why even minor irregularities in the contacting surfaces of the workpieces can lead to such pressure differences is found in the high moduli of elasticity of those metals principally concerned, such as, e.g., steel which has a modulus of elasticity in order of 20000 $kg/mm^2$. With such high moduli of elasticity, the pressing together of the raised regions of the contacting surfaces of the workpieces as the workpieces are pressed together as a whole is too slight for the differences in height in the surface profile to be compensated for and for the lower-lying surface regions to be brought in contact with one another.

For these reasons, the many attempts undertaken hitherto to weld two workpieces leak-tightly together over an elongated locus, simultaneously along the entire locus, in a unified welding process, by means of resistance-welding, such as the often-undertaken attempts to weld in a single resistance welding operation tube-flanges leak-tightly to a sheet proved unsuccessful. During these efforts to weld tube-flanges it was, moreover, shown that one achieved either, with low welding-currents, only a spot-like weld limited to the contacting raised surface-regions, of the ring-surfaces to be joined, with an extraordinarily slight welding-depth, or with higher welding-currents, burn-marks in the contacting raised surface-regions having gas- and blister-formations, resulting in an unacceptable joint from the outset. These burn-marks are explained by the concentration of welding-current, at the start of welding, on the contacting raised surface-regions which have a total surface area substantially smaller than the ring-surfaces making up the entire joint. Consequently, in selecting a welding-current in accordance with a means current-density related to the total ring-surface, a current-density far greaer than the mean current-density in any case results at the contacting raised surface-parts at the start of welding, the contact-resistance at those places where the welding-current has concentrated recedes greatly, leading to a further smaller area-wise concentration of the welding-current and hence to a further considerable increase in the current-density at the places concerned, leading to the burn-marks. Magnetic effects may also play a part in these powerful current-concentrations, particularly in view of the fact that, simultaneously with these powerful current-concentrations, welding at the originaloy lower-lying surface-parts, is as a rule also prevented, although these lower-lying surface-parts are also likely to come in contact with one another after the start of welding and the raised surface-parts begin to soften.

The failures encountered in these attempts to join tube-flanges liquid-tightly to a sheet in a single resistance-welding operation, and the unsuitability of known roller seam welding methods for this purpose, has led to the use of seals for tube-flanges, and particularly plugs in sheet-metal drums since other welding-methods, such as, for example, arc welding along the joints, or with a welding-gas flame under a gas-shield, had proven to be either unsuitable or technically too demanding. Seals, of course, have the known disadvantage that the sealing material has to be suited to any liquid coming into contact with the seal and, in certain circumstances, relatively expensive sealing-materials are required. In addition, with certain sealing-materials, aging effects also have to be taken into account and, at places sealed with seals, temperature-dependent leakages must sometimes be expected if the temperature fluctuations are extensive. The mechanical capacity of tube-flanges or plugs sealed with seals to withstand stresses is also limited, so that, for example, during drop-tests prescribed for testing the capacity of sheet-metal drums to withstand stresses, leaks at plugs sealed with seals are quite likely to occur as a result of deformation of the drums or plugs.

The object of the invention was, therefore, to find a method of the kind in question whereby two workpieces can be welded leak-tightly together over an elongated locus, simultaneously along the entire locus, in a unified welding process, by resistance-welding, so that all problems hitherto encountered with seals can be avoided.

According to the invention, this is achieved with a method in which first, the margins of a sheet-like workpiece adjacent the joint edge are folded along the intended locus to create an abutting surface for an overlapping margin of the other workpiece such as a plug, this abutting surface being, during pressing of the two workpieces together, at first elastically yieldable. Thereafter, as the two workpieces are brought together and the two electrodes are applied to them and pressed together, the second workpiece is thereby pressed onto the initially elastically yielding abutting-surface on the sheet workpiece, and the pressing together is continued until the folded-over margin undergoes a permanent deformation and thereby the contacting surfaces of the workpieces are forced to accommodate or mate to each other. The the welding-current is switched on and the two workpieces are welded together along their entire mating regions simultaneously.

The main advantage of the present method is that it achieved for the first time a leak-tight weld over an elongated joint locus in a single, unified welding process, with simultaneous welding along the entire locus. The present method more specifically provides an efficient leak-tight welding of tube-flanges to sheets, and also of plugs to the sheet-walls of sheet-metal drums without the need for seals. Thus, the need is eliminated to tailor the sealed drums to each one of the intended applications therefor, or for each one of a series of different envisioned contents.

It is of particular advantage for the carrying out of the present method if the contact-surface of the other workpiece to be applied to the abutting-surface on the folded-over margin of the sheet workpiece is so formed as to be in raised or projecting relation to the contiguous parts of the other workpiece so that, at least until after welding is starting, a defined limited surface of contact exists between two workpieces and hence a necessary minimum current intensity required for welding results at the start of welding.

The problems occurring during simultaneous welding of elongated joints also include, among other things, the provision of a sufficiently high welding-current, due to the greater area of surface to be welded simultaneously, in comparison, for example, to spot-welding with roller seam welding, if a quality weld is to result. These high welding-currents not only involve relatively big welding-presses and hence high expenses for machinery but their application to the weld locus or, more precisely, an even or uniform current-distribution along the weld locus can be troublesome. Measures to prevent an excessive loss of heat from the welding-place can, further, also advantageously contribute towards keeping the required welding-currents low. It is of essential advantage, to this end, if the electrode to be applied to the sheet is applied to the region of the sheet bordering on the folded-over margin in such a manner that the heat arising at the welding-place must pass through the folded-over margin in order to reach the electrode contacting the sheet so that a low flow of heat from the welding-place to the latter electrode results. It is, further, of advantage in preventing extensive removal of heat from the welding-place if the other workpiece is designed in such a manner that its raised contact-surface to be laid against the abutting-surface of the folded-over margin of the sheet and the surface provided thereon for applying the associated electrode there to overlap on the average more than one-third, preferably more than one-half with the width of the folded-over margin of the sheet and that the width of the raised contact-surface itself is smaller than twice the sheet-thickness of the sheet and is preferably approximately the same size as said sheet-thickness, and that the effective corss-sectional area for conducting heat between said contact-surface and said surface provided for applying said electrode is smaller than three times, preferably smaller than twice, the contact-surface, so that only a small flow of heat also results from the welding-place to the electrode contacting the other workpiece.

In the preferred form of the present method, sheet is formed of a metal having a stress-strain diagram in which the stress at the flow-limit is a multiple of the change in stress in that part of the plastic range lying within the range of uniform elongation, and that electrodes are pressed toward each other so forcefully prior to switching on the welding-current that the folded-over margin is loaded beyond the flow limit of the sheet-metal and undergoes such a further deformation that, within the essentially even distribution of pressure along the abutting-surface, only very slight pressure-fluctuations occur. Moreover, these pressure-fluctuations have a ratio to the mean bearing-pressure of less than the ratio of the above changes of stress in the plastic range to the stress at the flow-limit. As the metal steel, preferably so-called unalloyed structural steel, is preferably used for both workpieces and at least for the sheet. In this preferred form of the present method, the accommodating or mating to each other of the surface-parts of the abutting-surface and the raised contact-surface of the other workpiece not already in contact results essentially through plastic deformation within that initial part of the plastic range where the pressure-stress is, with slight fluctuations, constant with increasing pressure. Therefore, after such accommodating is complete, an essentially even distribution of pressure along the bearing-surface results.

It has further proved advantageous for carrying out the present method that the welding-current is applied in the form of several successive current-pulses having alternating polarity, each such pulse having a pulse length extending over several line current periods, preferably in the range of from 50 to 200 msec. Particularly suitable for this purpose are so-called frequency-converter welding machines with which such pulse sequences, with welding-currents of up to 500 kA and more, can be produced via either a three-phase transformer, or a transformer of six-phase design, or a welding-transformer and a rectifier circuit arranged at its high-tension side.

With the present method, the force pressing the electrode toward each other and hence effecting the pressure on the welding-place should advantageously be maintained during the duty-cycle of the welding-current, preferably at a constant level.

The present method can be used to particular advantage for resistance-welding two workpieces to be joined along a circular locus, because in this case, for reasons of symmetry, the even current-distribution to the individual parts of such locus takes place, so to speak, of its own accord. Of course, the relative movement of the electrodes toward each other should, for circular joints, advantageously take place at least approximately in a normal-line direction to the plane of the circle of the locus.

In a particularly advantageous embodiment of the present method, the margin of the sheet workpiece is folded over at least approximately 180° into an essentially U-shaped cross-section, because the elastically or spring yielding abutting-surface can be particularly well produced in this manner. With circular loci, it is of considerable advantage, in addition to this folding-over of the sheet margin by approximately 180°, if the contiguous region of the sheet is indented in a trough-like manner with the folded-over margin offset from the sheet plane and the adjacent edge of the folded-over margin extends almost to the wall of said trough-shaped indentation. Thus, during the further deforming of the folded-over margin, the adjacent edge of the latter can support itself against the wall of said trough-shaped indentation. The other workpiece should, in this case, be preferably so designed that its contact-surface rests against the folded-over margin in the middle-region of the upper leg of the U-shaped folded-over margin. The advangage of such a trough-shaped indentation, and of the support it provides for the edge of the folded-over border is that the slightly inclined position of the upper leg of the folded-over border produced at first during its further deformation under the pressure of the electrodes is removed again after the edge of the folded-over margin has supported itself against the wall of the trough-shaped indentation, and thus no longer represents any impediment to the aimed-at close fit of the abutting-surface on the folded-over margin and the contact-surface of the other workpiece. For these reasons, a corresponding trough-shaped indentation of the sheet, equally with rectilineal and other non-circular joints can be of considerable advantage. A further advantage of such indentation in connection with plugs to be welded into bottom walls of steel drums is that the indentation results in the inner side of the welded-in plug lies at the same level at the bottom wall itself. Therefore, a complete emptying of the drum is possible which would not occur if the entry-opening of the plug projected higher than the inner side of the bottom-sheet.

If no such indentation of the sheet is present, it is recommendable to fold the margin of the sheet by more than 180°, preferably by 225° to 360°, so that a preferably approximately oval or round cross-section is imparted to the margin, such cross-section being essentially interlocked. This further folding-over of the margin takes the place of the support given the adjacent edge of said margin by the wall of the trough-shaped indentation.

The invention further concerns an apparatus for carrying out the present method, and in particular the variant of that method providing a U-shaped folded-over border, characterized by an apparatus for bending the margins of the sheet and a welding-press provided for welding the two workpieces at the intended locus as well as means for centering the workpieces and the circular-shaped locus provided thereon on the electrodes of the welding-press. The means for folding over the margins can advantageously comprise means for pressing a trough-shaped indentation into the sheet, and the means for centering comprise, in one of the electrodes, an indentation corresponding to the sheet, so that the two indentations fit together and thus center on the sheet workpiece.

The invention further concerns a use of the present method for liquid-tightly attaching a plug in a wall of a sheet-steel drum or container, characterized in that the drum wall is provided with a hole at the attachment place for the plug. For this purpose, the plug advantageously comprises a tube-shaped part provided with a thread on at least a part of its tube-length as well as an integral flange at one of its ends, the contact-surface of the plug being provided on one face of the flange. One of the electrodes is applied to the other face of the flange. The margins of the hole in the drum wall are advantageously folded over in such a manner that the diameter of the hole after its margins are folded over is not smaller than, and advantageously at least approximately equal to, the external diameter of the tube-shaped part of the plug.

By means of the accompanying drawings, the invention is in the following explained in more detail by reference to one embodiment.

Figure 1:
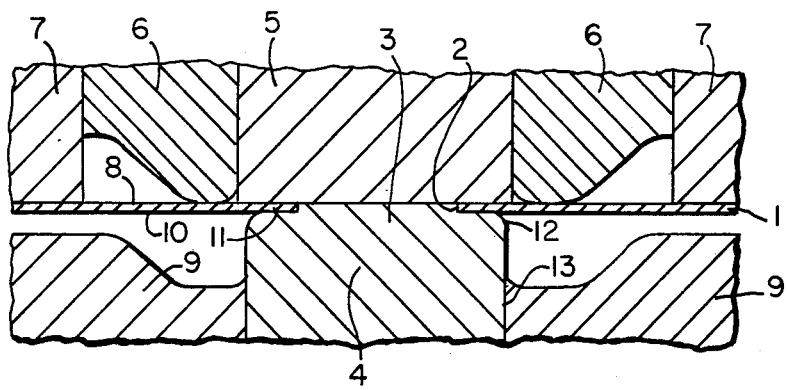
FIG. 1 is a partial cross-section of an apparatus for carrying out a first operational step of the present method, consisting in the deep-drawing of a trough-shaped indentation in a sheet provided with a hole and the simultaneous first stage in folding over the margins of the hole, the apparatus being seen in its starting position.
Figure 2:
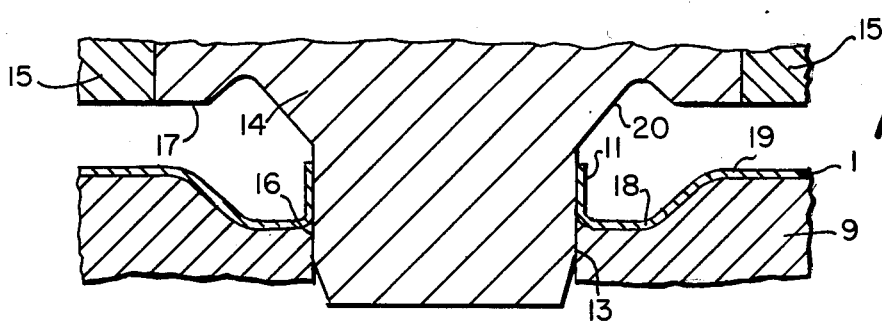
FIG. 2 is a partial cross-section of an apparatus for carrying out a second operational step of the present method, consisting in a second stage in folding over of the margins of the hole, to effect a cone-shaped widening of the margins as folded over in the first step, the apparatus being seen at the beginning of the second stage.
Figure 3:
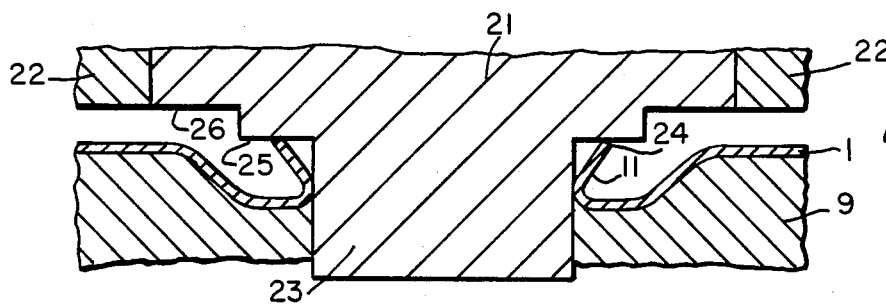
FIG. 3 is a partial cross-section of an apparatus for carrying out a third operational step of the present method, consisting in a third and final stage in the folding-over of the margins of the hole, whereby a total fold of approximately 180° is obtained, the apparatus being again seen in its beginning position for the third stage.
Figure 4:
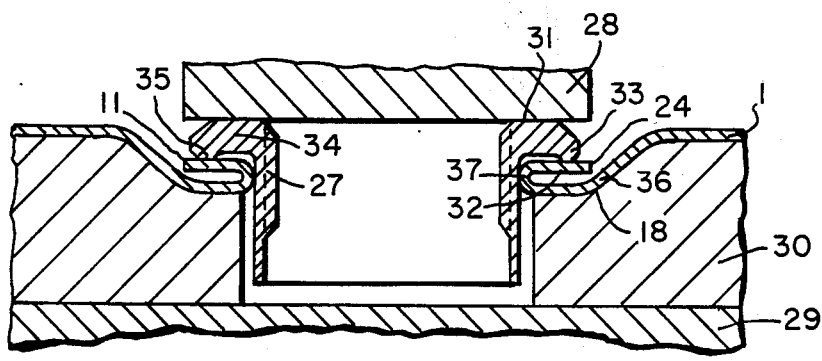
FIG. 4 is a partial cross-section of the welding-press provided for carrying out a fourth operational step of the present method, with the two workpieces in position to be welded together and the electrodes applied to the workpieces, but prior to starting pressing the two electrodes together.

The example of the present method showin in the drawings 1 through 5, in the form of various operational steps is concerned with welding a plug into a sheet 1, forming the bottom wall of a sheet-metal drum. The sheet 1, provided at the attachment-place of the plug with a circular hole 2, is first, in a first operational step, inserted in the drawing-press as in FIG. 1 and centered by means of the hole 2 on the circular attachment 3 on the drawing-die 4 and having approximately the same diameter as hole 2. The sheet is then gripped by simultaneously presenting the holding-down element 5 as well as the drawing-punch 6 and the pressure ring 7, and by further presenting the draw-die 9, the pressure ring 7 and the draw-die 9 being pressed with sufficient force toward each other that those parts of the sheet-part 1 resting against pressure ring 7 are held securely by the pressure ring and draw-die during the subsequent drawing operation. Then, the drawing-punch 6 and the drawing-die 4, together with the holding-down element 5 are telescoped together, the drawing-punch 6 being moved until the lower side 10 of the sheet fits against the draw-die 9, and until the upper side 8 of sheet 1 fits against the drawing-punch 6 producing the trough-shaped indentation 18, and until the margins around holes 2 are deflected upwardly around the cylindrical part of the drawing-die 4. During the drawing operation, therefore, the sheet 1 is pressed into the draw-die 9 to create indentation 18, and the hole margins 11 are upset by 90°. After the drawing operation, therefore, the sheet has the form shown in FIG. 2. The same result can, incidentally, also be achieved without the holding-down element 5, the drawing-die 4, acting in this case as a punch, being then, however, advantageously made more pronouncedly rounded at its upper edge 12. After this drawing operation the holding-down element 5 and the drawing-punch 6 are first withdrawn upwards, and then the pressure ring 7 is withdrawn upwards and the drawing-die 4 downwards, simultaneously so that the sheet 1 remains in the draw-die 9. Now, the drawing-die 4 is withdrawn from the central opening 13 provided for it in the draw-die 9, so that the draw-die 9 can be subsequently displaced in a lateral direction together with the sheet 1 remaining in place thereon. The first operational step is thereby concluded, and the draw-die 9 together with the sheet-part 1 is now moved, on a revolving table (not shown), by rotating the table by 120°, under the widening-punch 14 to carry out a second operational step. The widening-punch 14, together with the scraper-ring 15, are then moved downward, the cylindrical part 16 of the widening-punch 14 being first inserted into the upstanding hole margins 11, and then into the central opening 13 in the draw-die 9, a centering of the sheet-part 1 as well as of the said draw-die 9 on the widening-punch 14 being thereby effected simultaneously. FIG. 2 shows this operational stage, in which the cylindrical part 16 of the widening-punch 14 is engaged completely in the upstanding hole margins 11 as well as in the opening 13. However, the downward movement of the widening-punch 14 as well as scraper ring 15 is continued beyond the stage shown in FIG. 2 until scraper ring 15 and the outer border 17 of widening-punch 14 rest on the surface 19 of sheet 1 surrounding the trough-shaped indentation 18 in sheet-part 1. The upstanding hole margin 11 between the stage shown in FIG. 2 and the application to the sheet 1 of the widening-punch 14 and the scraper ring 15, is widened by the conical part 20 of widening-punch 14 and thereby folded over to an angle of up to approximately 120°. After the widening operation, the sheet 1 thus has the form shown in FIG. 3. After this, the widening-punch 14 is first retracted upwardly until its cylindrical part 16 no longer touches the sheet 1 or the hole margins 11 now folded over by 120° and widening-punch 14 is no longer able to carry the sheet 1 with it upward during its upward movement. Then, scraper ring 15 is also retracted upwards so that, in turn, sheet 1 remains behind in the draw-die 9. The second operational step is thereby concluded, and the draw-die 9, together with the sheet 1, is now moved, on the same revolving-table, under a bending-punch 21 for the execution of a third operational step. The bending-punch 21, together with the scraper ring 22, is now moved downward, the lower cylindrical part 23 of bending-punch 21 being extended first into the partially folded-over hole margins 11 and then into the central opening 13 in the draw-die 9, thereby centering the sheet 1 as well as draw-die 9 on the bending-punch 21. FIG. 3 shows this operational stage, in which the lower cylindrical part 23 of bending-punch 21 is extended into the folded-over hole margins 11 and into the opening 13 to such an extent that the edge 24 of the partially filed hole margins 11 just touches the actual punch-surface 25 of bending-punch 21. The downward movement of the bending-punch 21 and of the scraper ring 22 is, however, continued beyond the stage shown in FIG. 3 until the scraper ring 22 and the outer border 26 of bending-punch 21 rests on the surface 19 of the sheet 1 surrounding the trough-shaped indentation 18. In this section of movement between the stage shown in FIG. 3 and the application to the sheet 1 of the bending-punch 21 and the scraper ring 22, the hole margins 11 are folded over further by the punch-surface 25 of bending punch 21 up to an angle of approximately 180°. After this bending operation, the sheet 1 thus has the form shown in FIG. 4. Then, the bending-punch 21 is first retracted upwards until the lower cylindrical part 23 of bending-punch 21 no longer touches the plate 1 or the fully folded hole margins 11 and bending-punch 21 is no longer able to carry the sheet 1 with it upwards during the upward movement of the bending-punch, and scraper ring 22 is also retracted upwards so that this time, too, sheet 1 therefore remains behind in the draw-die 9. The third operational step is thereby concluded, and the sheet 1 is now removed from the draw-die 9. Finally, the new empty draw-die is, by further rotation of the revolving table, again moved under the drawing-punch 6 as well as under the pressure ring 7 and the holding-down element 5, and, after pushing up the drawing-die 4, a new sheet is placed on the attachment 3 through the central opening 13 in draw-die 9, after which the three-part operational sequence is repeated with the new sheet. If three draw-dies 9 are arranged on the revolving table at an angular distance of 120° from each other, and if, simultaneously with each drawing operation, the widening operation is carried out on the draw-die preceding by 120° and the bending operation is carried out on that draw-die preceding by 240°, with each machine stroke a finished sheet 1 in the form shown in FIG. 4 can be removed at that station performing the bending operation and a new sheet 1 in the form shown in FIG. 1 can be inserted at that station performing the drawing operation. In this way, during each machine stroke or the drawing operation, widening operation and being operation take place simultaneously on different sheets. In order to increase the production speed, a further, fourth, station can also be provided serving only to remove the finished sheet-part. It then, however, becomes necessary to arrange the four stations at an angular distance of 90° from each other and, naturally, also to provide four draw-dies 9 arranged on the revolving table at an angular distance of 90° from each other, and to rotate the revolving table by 90° after each machine stroke. The production speed is increased by the additional removal station because, with only three stations, the removing of the finished sheet, rotating of the revolving table and inserting of a new sheet have to take place one after the other in time, whereas, with an additional removal station present, the removing of the finished sheet and the inserting of the new sheet can take place at the same time after the rotating of the revolving table has taken place. From a constructional point of view, it should be further pointed out that, with a suitable constructional design, the three stations performing the drawing, widening and bending can be actuated by one and the same press. After removing the finished sheet 1 from the station performing the bending operation, or out of the removal station, it is conveyed through a loading station where the plug 27 is pushed into the opening enclosed by the folded-over hole margins 11, and the sheet 1 provided with the pushed-in plug 27 is then, as shown in FIG. 4, inserted in a welding-press where the electrode 28 is movable in a vertical direction while electrode 30 is firmly mounted on the electrode plate 29 of the welding-press.

Following this, the actual ultimate operational step of the present method; namely, the liquid- and gas-tight welding of the plug 27 to sheet 1 or to the fold-d-over hole margins 11, is carried out. The welding step is carried out in detail as follows: after inserting the sheet 1 provided with the pushed-in plug 27 into the electrode 30, the electrode 28 is moved downward and at first approached to the upper side 31 of plug 27. FIG. 4 shows this operational stage in which sheet 1 is inserted into the electrode 30 and the electrode 28 is approached up to the plug 27 pushed into sheet-part 1. The downward movement of the electrode 28 is, however, continued beyond the stage shown in FIG. 4, electrode 28 being, from the moment it rests upon the upper surface 31 of plug 27, invested with a pressing-force of 2000 kg. By means of this pressing force, a mean pressure of approximately 18 kg/mm$^2$ is exerted on the abutting surface 32 by the contact-surface 35, which rests on abutting-surface 32 on the folded-over hole margins 11, having a diameter of 69 mm and a width of ½ mm, being formed on the projection 33 on the lower side of the plug-flange 34. The actual pressure is, as a result of a slight convex curvature of abutting surface 32 arising during the bending operation described above, as a rule even considerably higher and capable of amounting to approximately five times the mean pressure. Since the actual pressure thus lies above the compressive strength of unalloyed structural steel, lying between approximately 30 and 50 kg/mm$^2$, which forms the plug and sheet 1, the pressing-force exerted on said plug 27 leads to a plastic deformation of the abutting-surface 32 and-/or of the contact-surface 35, because the edge 24 of the folded-over hole margins 11 was previously pressed down until it was supported on the wall 36 of the trough-shaped indentation 18 of sheet 1, and the folded-over hole margins 11, thus being supported on one hand at its bending-point 37 and at the other hand with the edge 24 on the wall 36, was pressed down somewhat further still. Through the pressing-down of the hole margins 11, taking place within the elastic deformation range up to a possible plastic deformation of the bending-point 37 before the supporting of the edge 24 against the wall 36, any inaccuracies in the parallelism of the various contacting surfaces are compensated for, and, by the plastic deformation of the bearing-surface 32 and/or of the contact-surface 35, such surfaces, resting against each other, accommodate to each other such that they rest against each other fully, not only at isolated points but over their entire surfaces, and therefore an even distribution of pressure results therebetween. Compensating for any inaccuracies of parallelism is of essential importance for the reason that such inaccuracies in parallelism can never be completely avoided during mass production and without such compensation, as explained at the beginning, even quite minor inaccuracies in the magnitude of a few microns can lead to considerable pressure-fluctuations along the contacting surfaces of the plug 27 and the sheet 1.

Figure 5:
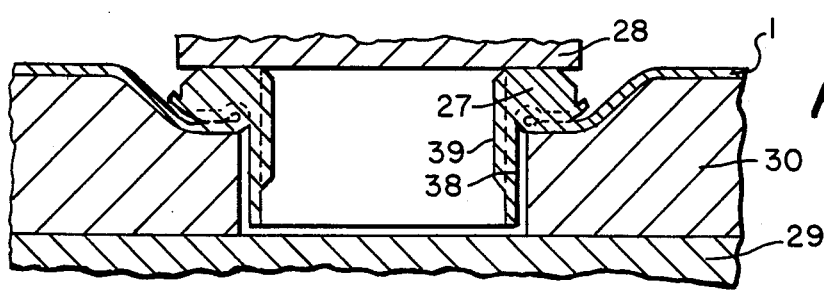
FIG. 5 is a partial cross-section in FIG. 4 after the welding together of the two workpieces.

After the plug 27, and hence the folded-over hole margins 11 have been pressed down by the electrode 28, and after the mating fit of the abutting surface 32 and contact-surface 35 has been achieved, the welding-current is switched on. This current is, in the present example, supplied by a three-phase frequency-converter welding-machine having a rated output of 200 kVA with a 50% duty-cycle and a maximum power of approximately 350 to 380 kVA and consisting of several successive current-pulses of alternating polarity having a pulse duration of from 100 to 150 msec and a level of from 100 to 150 kA and remains switched on for a total duration of from 0.5 to 1 sec. By this welding-current, the lower side of the plug-flange 34 is completely welded to the folded-over hole margins 11, the projection 33 on the lower side of said plug-flange sinking completely into the material of the folded-over hole margins as the latter soften during welding. Hole margins 11 themselves are heated up during welding, and are likewise pressed down into those regions of the sheet 1 lying underneath it and are also being correspondingly plastically deformed. FIG. 5 shows the plug 27 liquid-and gas-tightly welded to the sheet-part 1 after welding. The welding does not result in any alteration of the tube-shaped part 38 of the plug 27 or of the thread 39 provided therein, such as, e.g., distortion of the thread. The tube-shaped part 38 of plug 27 with the thread 39 can, therefore, be so designed, without more ado, so that, in connection with plug 27, the same standardized locking-plates, sealing-caps and filling apparatus can be used as with conventional plugs, sealed with seals. Since the width of the welding-place resulting at the end of welding is relatively large and, as can be seen in FIG. 5, extends over the entire flange-width, leaky or insufficiently leak-tightly welded-in plugs or rejects during production are not a problem. On the contrary, completely leak-tight welding-places are still obtained even with the alterations to the setting of the welding-machine within relatively broad limits, so that, consequently, the setting of the welding-machine is not absolutely critical. The large width of the welding-place results because, for the reasons already explained above, the heat-flow away from the welding-place is relatively slight and welding-currents which are relatively small with respect to the size of the welding-place can be employed. This, in turn, permits a relatively long welding-duration and hence an extension of said welding from the welding-place initially limited to the contact-surface 35 and the abutting surface 32 to the entire flange-width. Because of the uncritical setting and the negligible risk of rejects, production figures of up to 1000 units per hour and more can be obtained by the operational steps described above. As already mentioned, the necessary compensation of inaccuracies in parallelism is, in the described embodiment example, effected by the pressing-down of the folded-over hole margins 11 taking place essentially in the elastic deformation region assisted by the support of edge 24 against the wall 36 of the trough-shaped indentation 18 in the sheet 1. This, however, naturally requires, as can be seen in FIG. 4, that the trough-shaped indentation 18 be of a certain size or that its size and the width of the folded-over hole margins 11 be matched to each other, and, in all those cases where, for technical reasons, larger trough-shaped indentations are required or where such an indentation is not at all desired and the possibility of the supporting of the edge 24 against a wall of the indentation is therefore eliminated, the necessary compensation of inaccuracies in parallelism must be effected in another manner. The case of the required larger indentation is easy to imagine on the basis of FIG. 4 if one thinks of the edge 24 as being displaced slightly toward the inside. In this case, an inclined position of the abutting-surface 32 with respect to the contact-surface 35 would result during the pressing-down of the folded-over hole marings 11 when the edge 24 rests down at the bottom. In order to avoid such an inclined position the bending-punch 21 is, during the bending operation described with the aid of FIG. 3, pressed down so far that, at the end of the bending operation, the folded-over hole margins 11 rest, under the pressing force of bending-punch 21, almost flat on that part of the sheet 1 lying beneath it and springs back by only a little bit when the bending-punch 21 is retracted. Just as in the example of the present method described above, the hole margins 11 are thus again folded over by approximately 180°, but during the pressing-down of the folded-over margins 11, the abutting surface 32 not longer takes an inclined position with respect to the contact-surface 35 because the pressing-down is only possible over the small extent by which the folded-over hole margins sprang back during the retraction of the bending-punch 21. This extent is, as a rule, not sufficient to compensate for inaccuracies in parallelism. In this case, therefore, another known manner of compensating for inaccuracies in parallelism is used as, for example, the articulated mounting of one of the two electrodes with the help of a ball-joint having a half-ball arranged on the electrode and a corresponding ball-socket provided in the electrode support, the ball-socket and half-ball being sufficiently large in size that, when the welding-current is switched on, no major current-densities result at the surface of the contact between the ball-socket and the half-ball. Since, following the pressing-down, the folded-over hole margins 11 again rest almost flat on the underlying part of the sheet 1, a lower resistance at the welding site results than in the described example, so that a welding-machine with a higher power, e.g., a rated output of 250 KVA with 50% duty-cycle and a maximum power of 500 KVA, delivering current pulses at a level of 200 to 250 KVA, is required. In addition, because of the higher welding-current, current, a higher pressing force of, e.g., 3000 kg, has to be used to press the electrodes toward each other. In order to ensure that, despite the higher pressing force, an approximately similar mean pressure of the contact-surface 35 against the abutting-surface 32 of approx. 18 kg/mm$^2$ results, as with the described example, the contact-surface 35 is widened to approx. 0.8 mm at the projection 33 on the lower side of plug-flange 34.

Particularly in those cases where an indentation of the sheet 1 is not desired, but also in cases where it is desired to avoid matching the electrode 30 to a larger trough-shaped indentation in sheet 1, other centering measures must be provided. For example, the movable electrode can be provided with an insulated pin of approximately the same diameter as the internal diameter of plug 27, such pin being slightly conically tapered at the front and being coaxially movable and spring-mounted within the electrode. The pin projects from the front of the electrode before the beginning of its movement toward the plug and thus, during such movement, moves into the plug 27 with its front, tapered end and thereby centers the plug before the movable electrode comes to rest on the associated workpiece. Simultaneously with this centering of plug 27, the folded-over margins 11 of sheet 1 are also centered, either (as can be seen in FIG. 4) because plug 27 fits exactly into the hole widened after the bending-over of the hole margin 11, or, e.g., because three or more centering cams are provided at the inner circumference of the widened hole at the same angular distance from each other (said centering cams being capable of being fitted during, for example, the final phase of the third operational step or between the third and fourth operational steps) and because the plug 27 fits exactly into the circle defined by these centering cams.

Finally, it should be pointed out in general that, instead of the measures applied in the described example of the present method for both the necessary compensating for inaccuracies in parallelism and the centering of the workpieces, other known measures can be adopted for these purposes.

What is claimed is:

1. A method for forming by electrical resistance welding a fluid-tight joint along an elongated locus between two workpieces, at least one of said workpieces being a sheet having an edge adjacent said locus and consisting of a material which is bendable and capable of permanent deformation under load beyond its elastic limit, which method comprises the steps of: first, bending the margin of said sheet proximate said edge upon itself in a generally C-shaped re-entrant bend having a free upper leg spaced from and resiliently supported on a lower leg joined to the remainder of the sheet, and said free leg serving to abuttingly support on its exposed surface a contact surface on the other workpiece to be welded; assemblying said workpieces with the contact surface of said other workpiece in abutment with the exposed surface of said free leg; thereafter applying opposed welding electrodes to the opposite sides of the thus-assembled two workpieces with sufficient pressure towards one another that said other workpeice is pressed against said free leg of said re-entrantly bend sheet margin to cause first a resilient yielding of said free leg against said lower leg and then a permanent deformation of at least said free leg to bring the contacting surfaces of said assembled workpieces into intimate superficially mating relationship; and finally supplying a welding-current to said electrodes and across said workpieces while the same are maintained under pressure in said intimate mating relationship to weld the workpieces together simultaneously along the entire elongated welding locus.

2. A method according to claim 1, wherein said other workpiece has an edge adjacent the locus thereof to be welded and is provided adjacent that edge with a raised projection extending along the locus and carrying the surface of said other workpiece for abutting contact with the free leg of said re-entrantly bent margin of said sheet workpiece and providing a defined, limited surface of contact between said two workpieces consistent with the minimum current density thereover at the minimum current intensity required for welding to be initiated.

3. A method according to claim 1, wherein said other workpiece has a surface thereon in opposed relation to the contact surface thereof for receiving the associated welding electrode and this electrode-receiving surface and said contact surface are spaced apart a mean distance of more than one-third of the width of said re-entrantly bent margin of said sheet, and the width of the mutual contact-surface between said workpieces is less than twice the thickness of said sheet so that a small flow of heat occurs from said welding locus to the electrode applied against said other workpiece.

4. A method according to claim 1, wherein said sheet workpiece is formed of a material having a stress-strain diagram such that the stress at the flow-limit of permanent deformation is a multiple of the changes of stress within the range of the uniform elongation, and the disribution of pressure along the mutual contact surface between said workpieces is sufficiently uniform that any fluctuations in such pressure have a ratio to the mean pressure that is less than the ratio of said changes of stress in said uniform elongation range to said stress at said flow-limit.

5. A method according to claim 1, wherein at least said sheet is formed of steel.

6. A method according to claim 1, wherein said welding-current is applied in the form of several successive current pulses of alternating polarity, each of said current pulses having a pulse duration extending over several line current periods.

7. A method according to claim 1, wherein the force of said pressure applied to said electrodes to press the same toward each other is maintained generally constant during the duty-cycle of said welding-current.

8. A method according to claim 1, wherein said two workpieces are to be joined along a substantially circular locus, and the relative movement of said electrodes toward each other is in a direction generally normal to the plane of said circular locus.

9. A method according to claim 1, wherein the free and lower legs of said re-entrantly bent sheet margin extend substantially parallel to one another and parallel to the general plane of the sheet.

10. A method according to claim 1, wherein an end region of said sheet workpieces terminating in said re-entrantly bent margin is offset from the general plane of the sheet to form a trough-like indentation in said sheet containing said re-entrantly bent margin and connected to the remainder of the sheet by an oblique wall disposed adjacent the free edge of the free leg of said re-entrantly bent margin, whereby, during said permanent deformation of at least the free leg of said reentrantly bent margin, said free leg edge is supported against said oblique wall of said trough-shaped indentation.

11. A method according to claim 1, wherein the free leg of said re-entrantly bent margin of said sheet workpiece is bent through an angle in excess of 180°.

12. A method according to claim 10, wherein said free leg of said re-entrantly bent sheet margin is bent through an angle of at least about 225° so that said margin has a generally tubular configuration.

13. A method according to claim 2, wherein said raised projection on said other workpiece is situated at generally mid-way of the width of said re-entrantly bent sheet margin.

14. The method of claim 1, wherein said other workpiece is a tubular plug having a laterally directed flange and the contact surface thereof is carried on one face of said flange.

15. The method of claim 14, wherein an annular raised bead projects from said flange face, said bead having a generally flat end parallel to said flange and forming said contact surface.

16. The method of claim 14, wherein said flange has a generally flat opposite surface for receiving the corresponding welding electrode.

* * * * *